US007093349B2

(12) United States Patent
Prete et al.

(10) Patent No.: US 7,093,349 B2
(45) Date of Patent: *Aug. 22, 2006

(54) SYSTEM FOR MANUFACTURING SASH WINDOW ASSEMBLIES

(75) Inventors: James G. Prete, Chicago, IL (US); Richard A. Gardner, Belvidere, IL (US); Steven E. Schultz, Rockford, IL (US); Mark V. Murphy, Oak Park, IL (US); Vincent F. Eslick, Chicago, IL (US); George E. Heid, Rockford, IL (US)

(73) Assignee: Newell Operating Company, Atlanta, GA (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 10/840,895

(22) Filed: May 7, 2004

(65) Prior Publication Data

US 2004/0255518 A1 Dec. 23, 2004

Related U.S. Application Data

(63) Continuation of application No. 10/342,491, filed on Jan. 15, 2003, now Pat. No. 6,751,904, which is a continuation of application No. 09/838,705, filed on Apr. 19, 2001, now Pat. No. 6,523,307.

(60) Provisional application No. 60/198,198, filed on Apr. 19, 2000.

(51) Int. Cl.
*B23P 19/00* (2006.01)

(52) U.S. Cl. ........................... 29/700; 29/783; 29/791; 29/430; 16/196; 49/445

(58) Field of Classification Search .................. 29/897, 29/897.3, 407.01, 407.09, 407.1, 417, 428, 29/700, 703, 783, 791, 430; 49/445, 181; 16/193, 196
See application file for complete search history.

(56) References Cited

U.S. PATENT DOCUMENTS

| | | | | |
|---|---|---|---|---|
| 2,921,348 | A | 1/1960 | Nardulli | |
| 3,195,193 | A | 7/1965 | Foster | |
| 3,197,819 | A | 8/1965 | Trout | |
| 3,358,403 | A | 12/1967 | Dinsmore | |
| 3,429,071 | A | 2/1969 | Phillips | |
| 3,440,683 | A | 4/1969 | Wood | |
| 3,600,855 | A | 8/1971 | Starck | |
| 3,676,956 | A | 7/1972 | Taylor et al. | |
| 3,789,549 | A | 2/1974 | Yip | |
| 3,945,149 | A | 3/1976 | Boucher | |
| 3,970,507 | A * | 7/1976 | Dalzell et al. | 156/446 |

(Continued)

FOREIGN PATENT DOCUMENTS

EP 0 417 822 A1 3/1991

(Continued)

*Primary Examiner*—Jermie E. Cozart
(74) *Attorney, Agent, or Firm*—Wallenstein & Wagner, Ltd.

(57) ABSTRACT

A balance assembly (15) is provided for a sash window assembly (10). The sash window assembly (10) has a sash window (12) slidable within a master frame (14). The balance assembly (15) has an elastomer balance member (30) having one end adapted to be connected to the master frame (14) and another end adapted to be connected to the sash window (12) to provide an upward biasing force to the sash window (12). A system (50) is provided for custom-manufacturing the balance member (30) and for custom-manufacturing a sash window assembly (10) incorporating the balance member (30).

5 Claims, 8 Drawing Sheets

U.S. PATENT DOCUMENTS

| | | | | |
|---|---|---|---|---|
| 4,079,549 | A | 3/1978 | Wood | |
| 4,227,345 | A | 10/1980 | Durham, Jr. | |
| 4,413,445 | A | 11/1983 | Trout | |
| 4,697,304 | A | 10/1987 | Overgard | |
| 4,718,194 | A | 1/1988 | FitzGibbon et al. | |
| 4,763,447 | A | 8/1988 | Haltof et al. | |
| 4,914,780 | A | 4/1990 | Rogers et al. | |
| 4,914,862 | A | 4/1990 | Gregory | |
| 4,935,987 | A | 6/1990 | Sterner, Jr. | |
| 5,036,622 | A | 8/1991 | Stark | |
| 5,117,587 | A | 6/1992 | Doan | |
| 5,119,592 | A | 6/1992 | Westfall et al. | |
| 5,207,025 | A | 5/1993 | Westfall | |
| 5,237,898 | A * | 8/1993 | Kubisiak | 83/227 |
| 5,313,761 | A | 5/1994 | Leopold | |
| 5,353,548 | A | 10/1994 | Westfall | |
| 5,371,971 | A | 12/1994 | Prete | |
| 5,463,793 | A | 11/1995 | Westfall | |
| 5,661,927 | A | 9/1997 | Polowinczak et al. | |
| 5,669,180 | A | 9/1997 | Maier | |
| 5,678,377 | A | 10/1997 | Leopold | |
| 5,806,243 | A | 9/1998 | Prete et al. | |
| 5,829,196 | A | 11/1998 | Maier | |
| 5,855,092 | A | 1/1999 | Raap et al. | |
| 5,873,199 | A | 2/1999 | Meunier et al. | |
| 6,041,476 | A | 3/2000 | deNormand | |
| 6,052,947 | A | 4/2000 | Smith | |
| 6,178,695 | B1 | 1/2001 | Kornegay et al. | |
| 6,338,222 | B1 | 1/2002 | Hetman, Jr. et al. | |
| 6,523,307 | B1 | 2/2003 | Prete et al. | |

FOREIGN PATENT DOCUMENTS

| | | |
|---|---|---|
| FR | 2704267 | 10/1994 |
| WO | WO 98/50656 | 11/1998 |

* cited by examiner

SYSTEM FOR MANUFACTURING SASH WINDOW ASSEMBLIES

RELATED APPLICATIONS

This application is a continuation application of and claims the benefit of U.S. Non-Provisional application Ser. No. 10/342,491, filed Jan. 15, 2003 now U.S. Pat. No. 6,751,904, which is a continuation application of and which claims the benefit of U.S. Non-Provisional application Ser. No. 09/838,705, filed Apr. 19, 2001, now U.S. Pat. No. 6,523,307, issued Feb. 25, 2003, which is a continuation-in-part application and which claims the benefit of U.S. Provisional Application No. 60/198,198, filed Apr. 19, 2000, all of which are expressly incorporated by reference and made a part hereof.

TECHNICAL FIELD

The present invention relates to a balance system for a sliding member and, more particularly to a balance system that can be custom manufactured into a variety of sash window assemblies and that utilizes an elastomer balance member.

BACKGROUND OF THE INVENTION

A pivotal sash window adapted for installation in a master frame of a sash window assembly is well-known. The sash window assembly typically has opposed, vertically extending guide rails to enable vertical reciprocal sliding movement of the sash window in the master frame while cooperatively engaged with the guide rails or shoe channels. The sash window has a top sash rail, a base and a pair of stiles cooperatively connected together at adjacent extremities thereof to form a sash frame, usually a rectangular frame. Typically, a pair of spaced tilt-latches are installed on, or in, opposite ends of the top sash rail. Retracting a latch bolt in each tilt-latch simultaneously allows the sash window to be tilted inwardly. To this end, the sash window is pivotally supported at its base by a pair of sash balance brake shoes. The brake shoes slide within the guide rails which are typically in the form of channels.

A balance assembly is typically included with the sash window assembly to counterbalance the sash window within the master frame. One form of the balance assembly includes a spring that is connected at one end to a top portion of the master frame, typically within the shoe channel, and at another end to the brake shoe. The spring exerts an upwardly biasing force against the weight of the sash window. Different types of springs have been used in the balance assemblies. For example, a leaf spring is wound into a coil which is mounted to the guide rail and a free end of the spring is connected to the brake shoe. Some balance systems have been disclosed reversing the leaf spring configuration wherein the coiled end of the leaf spring is connected to the brake shoe and the free end is connected to the guide rail. Conventional spiral coil springs have also been used in balance systems. Block and tackle balance systems have also been utilized. These balance systems can be costly and can require large shoe channels to accommodate the balance systems.

In certain instances, the weight of the sash window requires increased counterbalance forces. Thus, multiple leaf springs have been used in tandem to increase these forces. Because windows can vary in size and weight, it can be difficult to specify a standard balance system that provides the most optimum counterbalance force against each sash window. As a result, window manufacturers must carry several different models of a balance systems having different sized springs that offer different counterbalance forces. This increases required inventories and factory space required to house all of the balance systems.

The present invention is provided to solve these and other problems.

SUMMARY OF THE INVENTION

It is an object of the present invention to provide a balance system to counterbalance a weight of a sash window of a sash window assembly.

The master frame has opposed, vertically extending guide rails in the form of channels. The sash window has a top sash rail, a base and a pair of stiles cooperatively connected together at adjacent extremities to form a frame. A balance system is provided to counterbalance the sash window. The balance system includes a balance member. A brake shoe can be provided on each side of the sash window. The brake shoe is connected to the balance member. The sash window is pivotally supported at its base by the brake shoes.

In accordance with one aspect of the invention, a system is provided to custom manufacture balance systems to be installed in sash window assemblies. According to another aspect of the invention, a balance system is provided using multiple balance members in tandem. The balance members are sized to provide varying counterbalance forces. In a preferred embodiment, a system is provided wherein three different balance members are provided. The balance members are chosen to provide different counterbalance forces.

According to another aspect of the invention, the balance member is an elastomer member. In one preferred embodiment, a plurality of elastomer members are woven together to form the balance member connected to the brake shoe.

According to another aspect of the invention, an elastomer balance member is provided having one end adapted to be connected to the master frame and another end adapted to be connected to the sash window to provide an upward biasing force to the sash window. In one embodiment, the balance member has a first end having a first loop. The first loop is adapted to receive a fastener to fasten the first end to the master frame. The balance member also has a second end having a second loop. The second loop is adapted to be attached to a brake shoe connected to the sash window. In one preferred embodiment, the elastomer member is a silicone rubber member.

According to another aspect of the invention, the elastomer balance member has a generally cylindrical cross-section. According to yet another aspect of the invention, the balance member comprises a first elastomer member and a second elastomer member wherein the members are coextruded. According to a further aspect of the invention, the balance member comprises a plurality of elastomer members woven together.

According to another aspect of the invention, a balance system is provided having a brake shoe and a balance member. The brake shoe is adapted to be connected to the sash window. The balance member has one end adapted to be connected to the master frame and another end adapted to be connected to the sash window to provide an upward biasing force to the sash window. The balance member has a first elastomer member having a first end and a second end wherein the first end is connected to the brake shoe. A first joiner is connected to the second end of the first elastomer member. A support member is provided and is fastened to an upper portion of the master frame. A cord is provided having an intermediate portion extending between a first end and a second end. The first end of the cord is attached to the first joiner and the intermediate portion passes over the support member. A second joiner is connected to the second end of the cord. A second elastomer member has a first end and a second end wherein the first end is connected to the second joiner and the second end is adapted to be connected to the master frame.

According to a further aspect of the invention, a system for custom-manufacturing a sash window assembly is provided. A master frame conveyor is provided wherein frame members are conveyed to different stations and are formed into a master frame. A sash window conveyor is provided wherein extrusion members and glass panes are conveyed to different stations and are formed into a sash window. A balance system conveyor is provided wherein a plurality of balance members are provided and one or more balance members are selected according to specifications of the sash window and are connected to a brake shoe to form a balance system. The balance system is installed into the master frame. The sash window is installed into the master frame and is connecting to the balance system. The selection of the balance member is controlled based on the specifications of the sash window.

According to a further aspect of the invention, a balance system is provided for a closure of an opening in a structure, the closure slideable within the structure. An elastomer member has one end adapted to be connected to the structure and another end adapted to be connected to the closure to provide a biasing force to the closure. The closure can be vertically or horizontally operable. The closure can be as sash window, a sliding door or a garage door.

According to yet another aspect of the invention, a system is provided that biases a sliding member slideable within a support structure. An elastomer member has one end adapted to be connected to the sliding member and another end adapted to be connected to the closure to provide a biasing force to the closure. The elastomer member is placed in tension for an extended period of time. The sliding member can be, among other things, a sash window or door.

Other features and advantages of the invention will be apparent from the following specification taken in conjunction with the following drawings.

DETAILED DESCRIPTION

Figure 1:
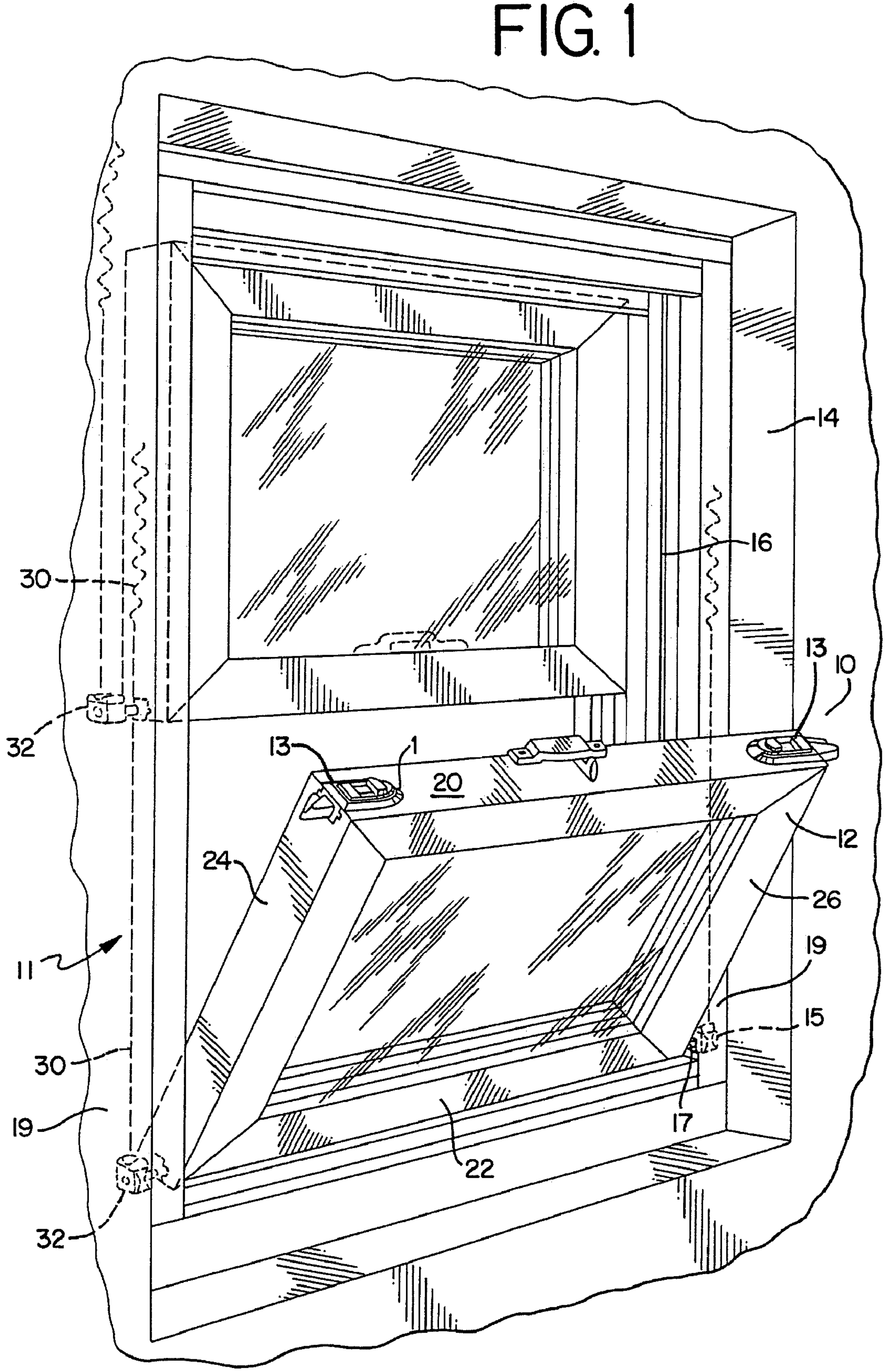
FIG. 1 is a perspective view of a double-hung sash window assembly.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows a balance assembly of the present invention used in a sash window assembly 10 generally designated with the reference numeral 10. The sash window assembly 10 shown in FIG. 1 is a double-hung window assembly having a pair of pivotal sash windows 12 installed in a master frame 14. Tilt-latches 13 are used with the sash window 12. The sash window 12 is pivotally mounted to the master frame 14 by a balance assembly 15 that also provides an upward biasing force against the weight of the sash window 12. It is understood that the balance assembly can also be used with windows that are not designed to pivot. The balance assembly 15 is positioned within a shoe channel 19 of the master frame 14. As is well known, the master frame 14 has opposed, vertically extending guide rails 16. The guide rails often incorporate shoe channels that slidingly receive brake shoes as described below. The sash window 12 has a hollow top sash rail 20, a base 22 and a pair of hollow stiles 24,26, cooperatively connected together at adjacent extremities thereof to form a sash frame, typically rectangular although other shapes are possible. The sash frame could be made from extrusions or pulltrusions that are filled with fiberglass, epoxy, plastic, or wood chips. The sash frame could also be solid and made from wood, masonite or pressboard.

The balance assembly 15 having a unique balance member will first be described. A system for custom-manufacturing the balance assemblies and custom-manufacturing the sash window assemblies incorporating balance assemblies will then be described.

As shown in FIG. 1, the balance assembly 15 generally includes a balance member 30 and a brake shoe 32. The brake shoe 32 is connected to one end of the balance member 30 while another end of the balance member 30 is connected to the window frame 14. Brake shoe 32 also receives a sash pin 17 from the sash window 12 thus connecting the sash window 12 to the brake shoe 32. Thus, the balance member 30 exerts an upward biasing force to counterbalance the weight of the sash window 12. The brake shoe 32 has a brake pad that is adapted to engage the shoe channel 16 in the window frame 14 when the sash window 12 is tilted. It is understood that a balance assembly 15 is typically connected on opposing sides of the sash window 12. It is further understood that balance assemblies are attached to both the lower sash and the upper sash in a double-hung window assembly.

While conventional balance members take the form of metal springs such as coil and spiral springs, the balance member 30 of the present invention is an elastomer. The elastomeric material used can be selected from a group including rubber (SBR, EPDM, NBR, NR, etc.), urethane, acrylic or other polymeric material. The material can also be a cross-linked thermoplastic or thermoset. In one preferred form, the balance member 30 is an elastomer member in the form of a cord that is cylindrical in shape. The cylindrical shape helps to reduce the chances of the member 30 tearing. The balance member 30 could also have a rectangular cross-section. The balance member 30, however, can also take other forms.

The balance member 30 can comprise a plurality of different elastomer members that can be spliced together to provide several different counterbalance forces. This will be described in greater detail below. The balance members 30 can be formed in several different thicknesses and widths. Thus, multiple types or formulations of elastomers can be employed to counter balance a wide range of sash weights.

Figure 2:
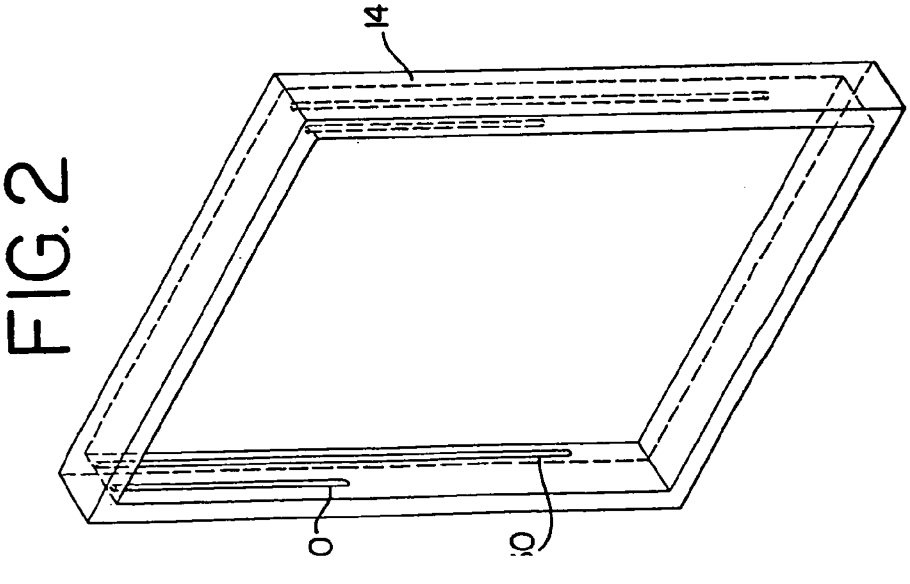
FIG. 2 is a perspective view of a sash window having a balance assembly of the present invention.
Figure 3:
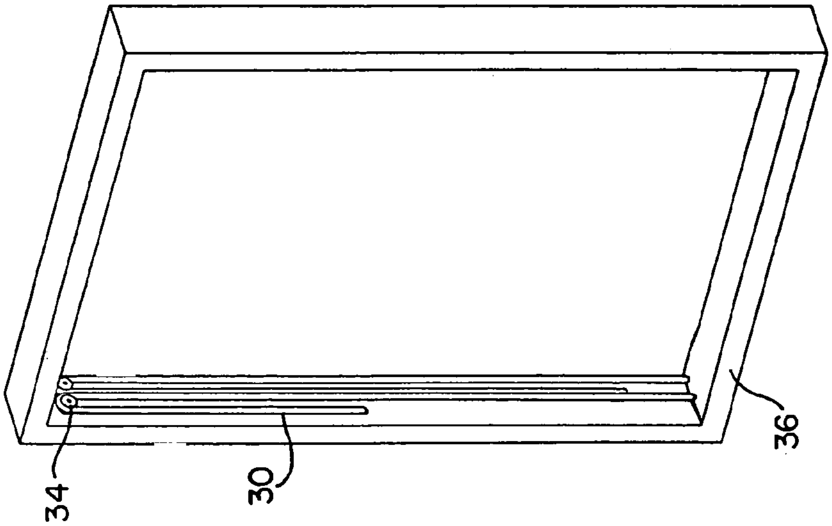
FIG. 3 is a perspective view of a sash window having another embodiment of a balance assembly of the present invention.
Figure 4:
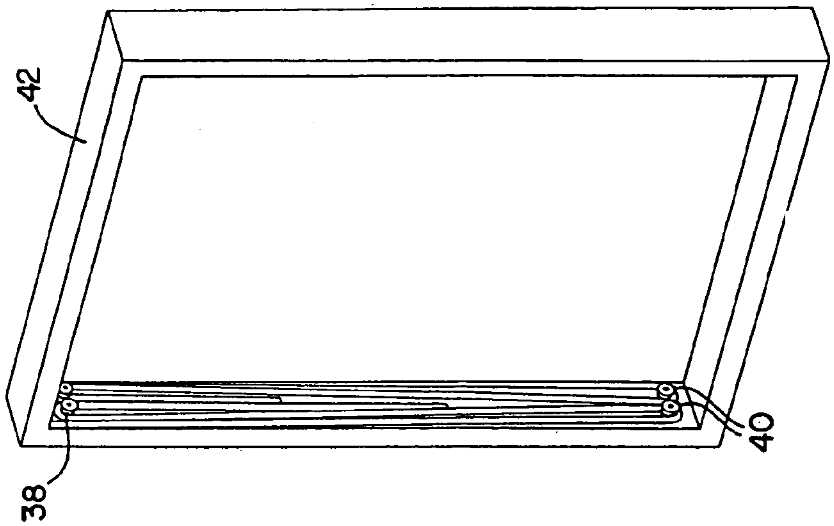
FIG. 4 is a perspective view of a sash window having another embodiment of a balance assembly of the present invention.
Figure 5:
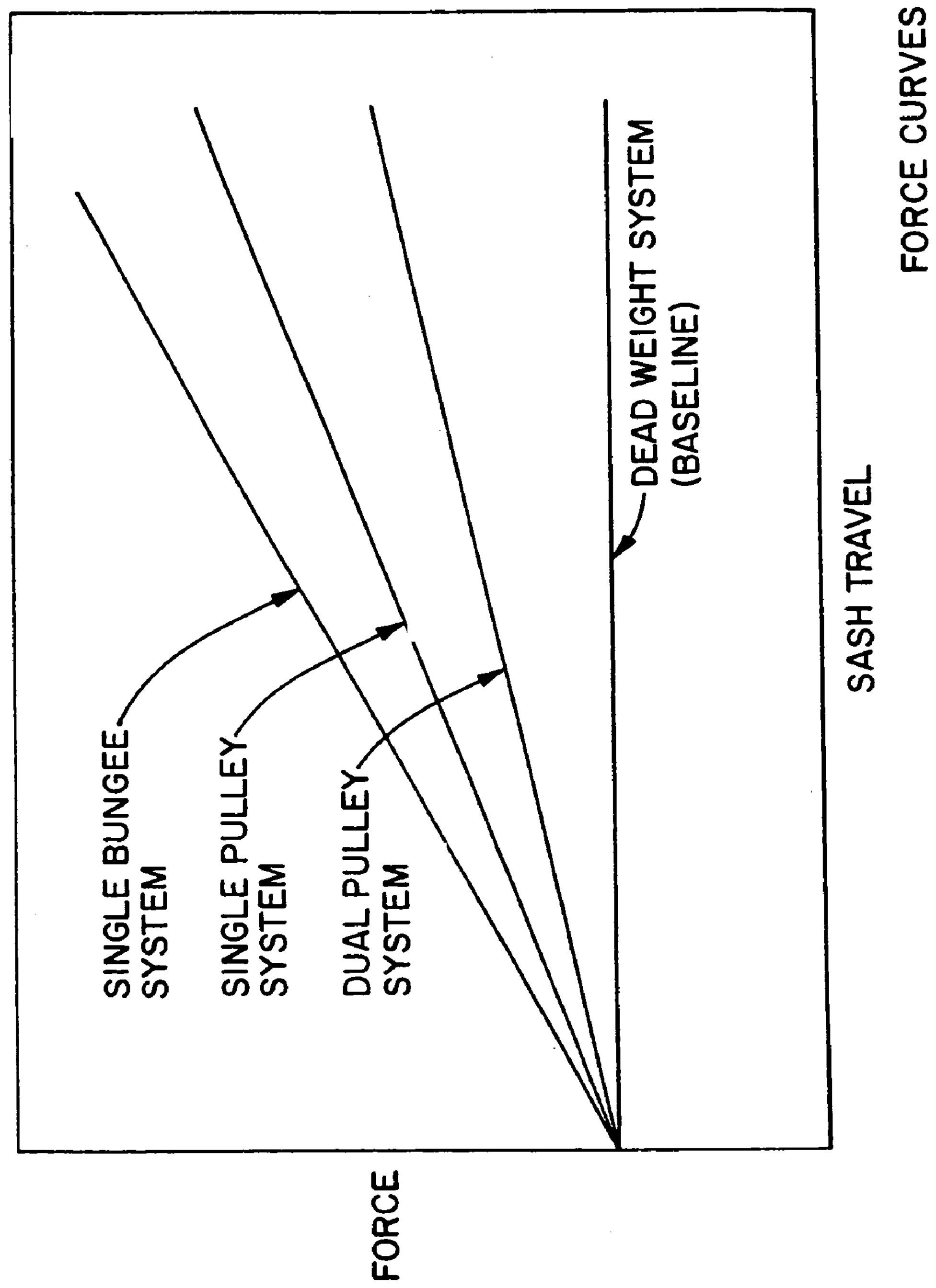
FIG. 5 is a force v. sash travel diagram for different balance systems of the present invention as well as a conventional balance system.

As shown in FIG. 2, the balance member 30 has one end connected to the window frame or master frame 14. This end can connect at the head or in the side jamb of the window frame 14. Its other free end is adapted to connect to the sash window 12 (not shown), typically via the brake shoe 32 (not shown). The length of the balance member 30 is determined by the desired counterbalance force as well as the size of the window assembly 10. As shown in FIG. 3, a pulley 34 can be provided in the balance system wherein the balance member 30 is wound over the pulley 34. In this configuration, the balance member 30 has its one end connected to a sill plate 36 of the window frame 14. By using the pulley 34, the force gradient of the balance member 30 is decreased. As shown in FIG. 5, a conventional coil spring has constant counterbalance force such as represented by the dead weight system. A single balance member 30 has an increased counterbalanced force as sash travel increases. Using the pulley 34 decreases the force gradient where there is less of an increase in counterbalance force with sash travel. Similarly, as shown in FIG. 4, an upper pulley 38 and a lower pulley 40 can be used. In this configuration, the balance member 30 is connected to the head jamb 42 of the window frame 14. As further shown in FIG. 5, this further lessens the force gradient associated with the balance member 30.

Figure 6:
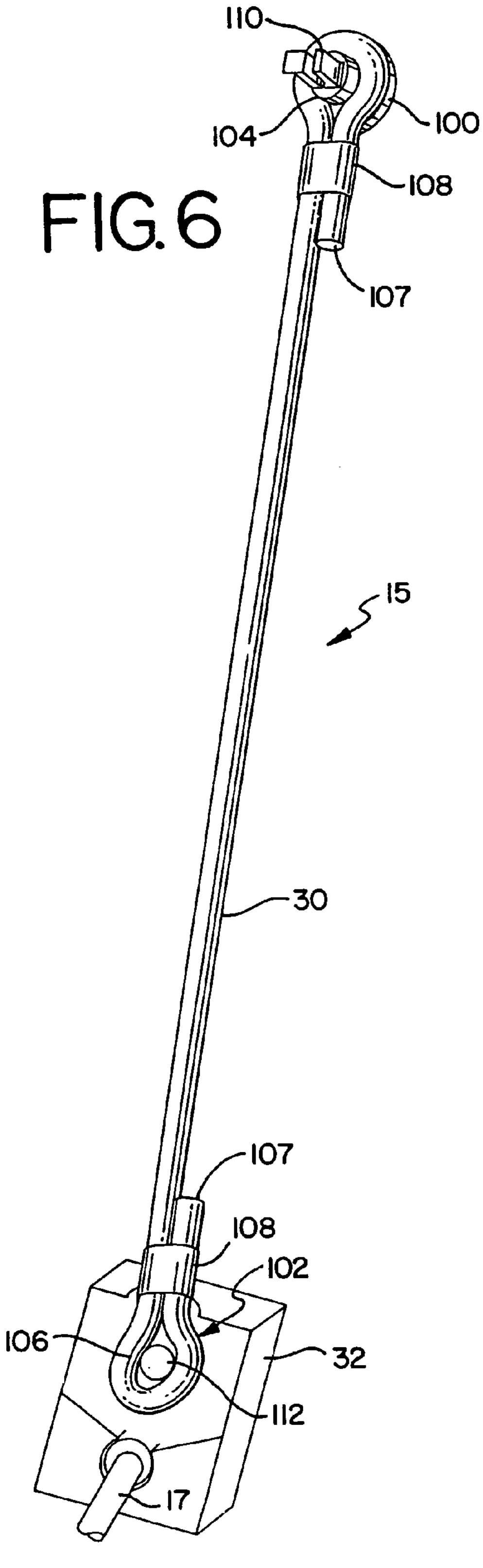
FIG. 6 is a perspective view of a balance system of the present invention.

FIG. 6 further discloses the balance system 30 of the present invention generally having the balance member 30. In this embodiment, the balance member can be connected to the brake shoe 32 although it is understood that the brake shoe 32 is not required. It is understood that the balance system 30 shown in FIG. 6 is positioned in the shoe channel 19 of the master frame 14 as shown in FIG. 1. The balance member 30 has a first end 100 and a second end 102. The first end 100 is adapted to be connected to the master frame 14, and the second end 102 is adapted to be connected to the sash window 12. The first end 100 has a first loop 104, and the second end 102 has a second loop 106. The loops 104,106 are formed by bending distal ends 107 of the member 30 and fastening the distal ends 107 to the member 30 by a band 108. Other connecting structure could also be formed by the balance member 30. In one preferred embodiment, the balance member 30 has a generally cylindrical cross-section. It is understood, however, that the balance member 30 can take many different forms.

The first loop 104 receives a fastener 110 that is adapted to be fastened to the shoe channel 19 thereby connecting the first end 100 of the balance member 30 to the master frame 14. The fastener 110 can take many different forms. The fastener 110 could be designed to be snap-fit into the master frame 14. The fastener 110 could also be a simple screw or clamp. A ball could also be connected to an end of the balance member 30 and would be adapted to fit within a slot/opening in the master frame to connect the member 30 thereto. The fastener 110 could also include gluing. The fastener 110 is designed to not damage the integrity of the outer surface of the balance member 30. The second loop 106 is designed to be fastened to the brake shoe 32. For example, the brake shoe 32 can be equipped with a post 112 wherein the second loop 106 is positioned around the post 112. Other attachment means known in the art are also possible. When installed, the balance member 30 is in a tensioned state to provide a counterbalance force to the sash window 12. Thus, the balance member 30 has an initial length L1 (not shown). When installed, the balance member 30 is stretched to an elongated length L2 (not shown) wherein portions of the balance member 30 move to the elongated length L2.

Figures 8, 9:
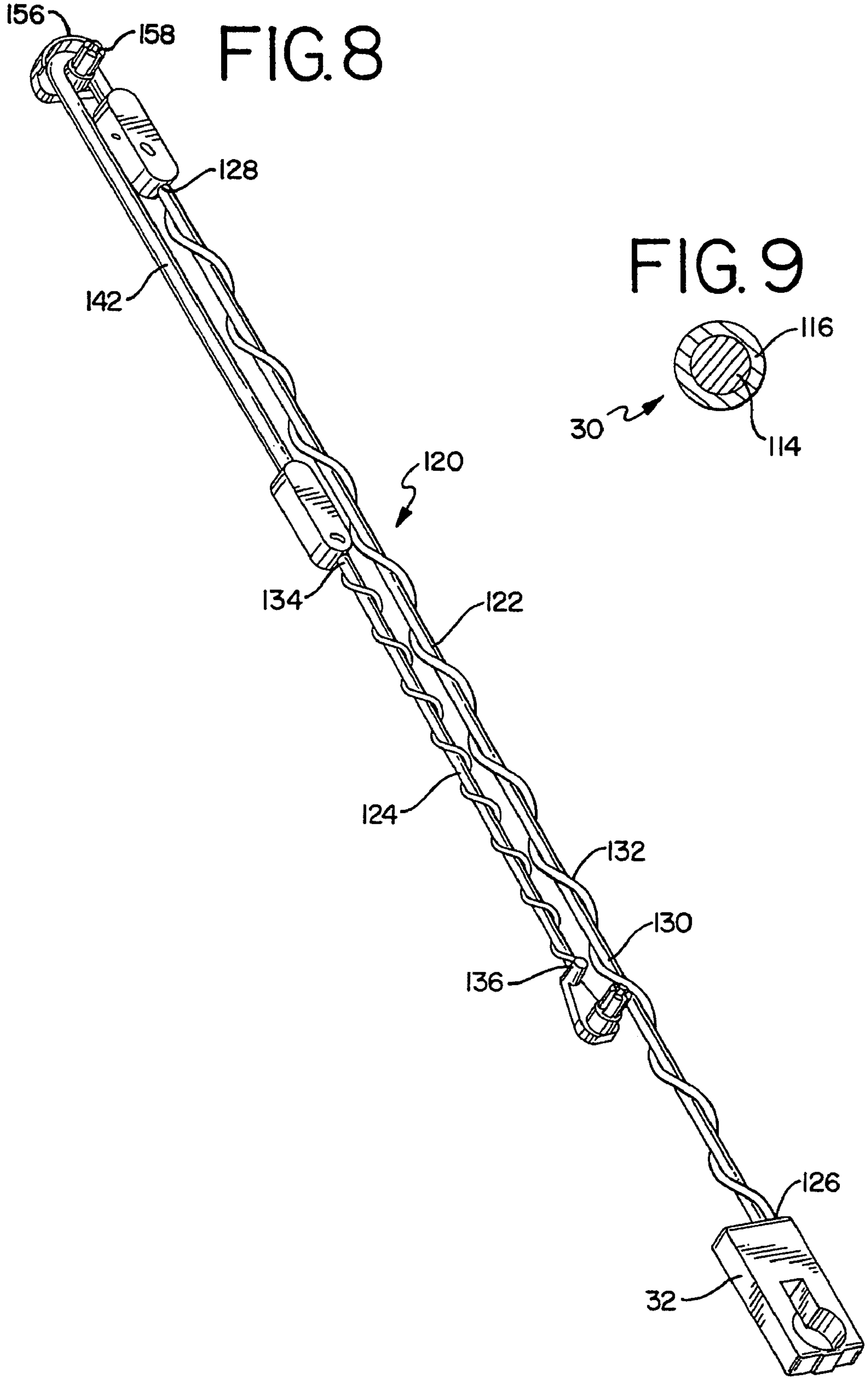
FIG. 8 is a perspective view of the balance system shown in FIG. 7.
FIG. 9 is an enlarged cross-sectional view of a balance member of the present invention.

As discussed, the balance member 30 can have different properties to vary the counterbalance force provided. For example, different elastomer materials can be used. The balance member 30 can also be made in various lengths and thicknesses. In setting the length of the elastomer balance member 30, the tensile set of the material being used is taken into consideration. The tensile set is the amount of increase (%) in length in a given time after releasing a tensioned member. The balance member 30 can also comprise a plurality of elastomer members woven together in braided form. As shown in FIG. 9, the balance member 30 can be a coextruded member having an inner material 114 and an outer material 116. The inner material 114 can be selected from materials that have good tensile properties. The outer material 116 can be selected from materials having good atmospheric properties, such as adequate resistence to weather conditions.

The balance member 30 is made from an elastomer. In one preferred embodiment, the elastomer balance member 30 is made from silicone rubber. The elastomer member 30 is designed to be maintained in tension for a prolonged period of time and still provide the required counterbalance force to the sash window 12. For example, the elastomer balance member 30 is designed for a life of fifteen to twenty years. The balance member 30 can be made from different elastomer materials to provide adequate force for varying prolonged periods of time. It is further understood that the elastomer balance member 30 provides counterbalance force both in a static state when the sash window 12 is stationary and in a dynamic state when the sash window 12 is raised or lowered. Typically, the elastomer balance member 30 is in a constant, static state of tension. The elastomer material is subject to general atmospheric conditions. The material is designed to provide a consistent counterbalance force notwithstanding warm or cold temperatures, or moisture.

Figure 7:
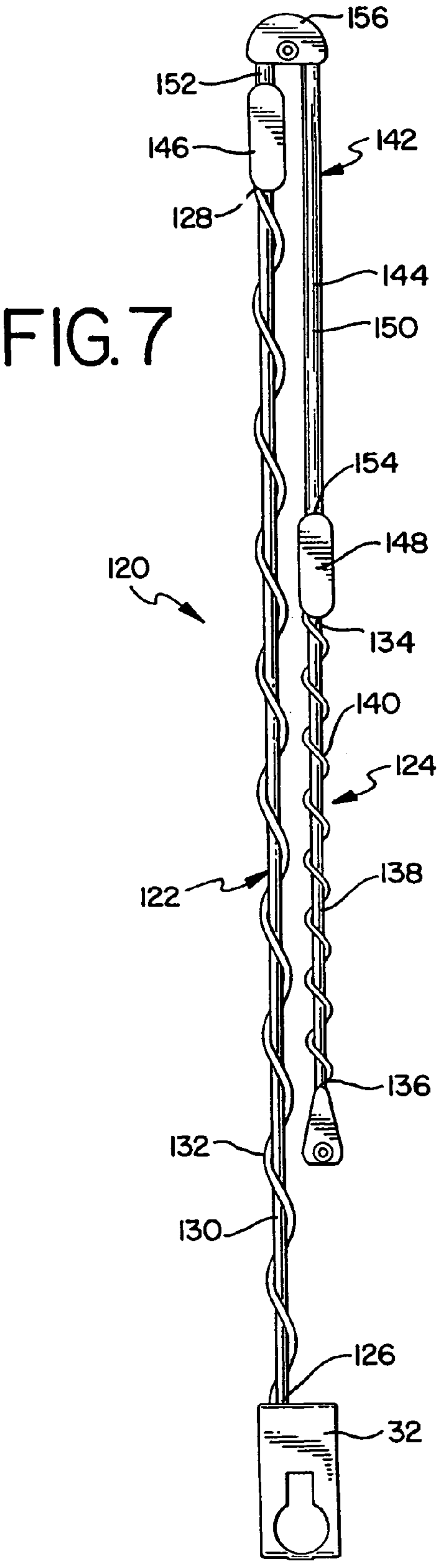
FIG. 7 is a front elevation view of another balance system of the present invention.

FIGS. 7 and 8 disclose another embodiment of a balance member of the present invention, generally referred to with the reference numeral 120. The balance member 120 comprises a first elastomer member 122, a second elastomer member 124, and a cord assembly 142.

The first elastomer member 122 has a first end 126 and a second end 128. The first elastomer member 122 comprises a primary member 130 and a secondary member 132 that is wrapped around the primary member 130. The second elastomer member 124 has a first end 134 and a second end 136. Similar to the first elastomer member 122, the second elastomer member 124 comprises a primary member 138 and a secondary member 140 that is wrapped around the primary member 138. The primary members 130,138 and secondary members 132,140 provide different balance forces and are combined to fine-tune the overall counterbalance force provided. It is understood that additional primary or secondary members could also be used.

Figures 11, 12:
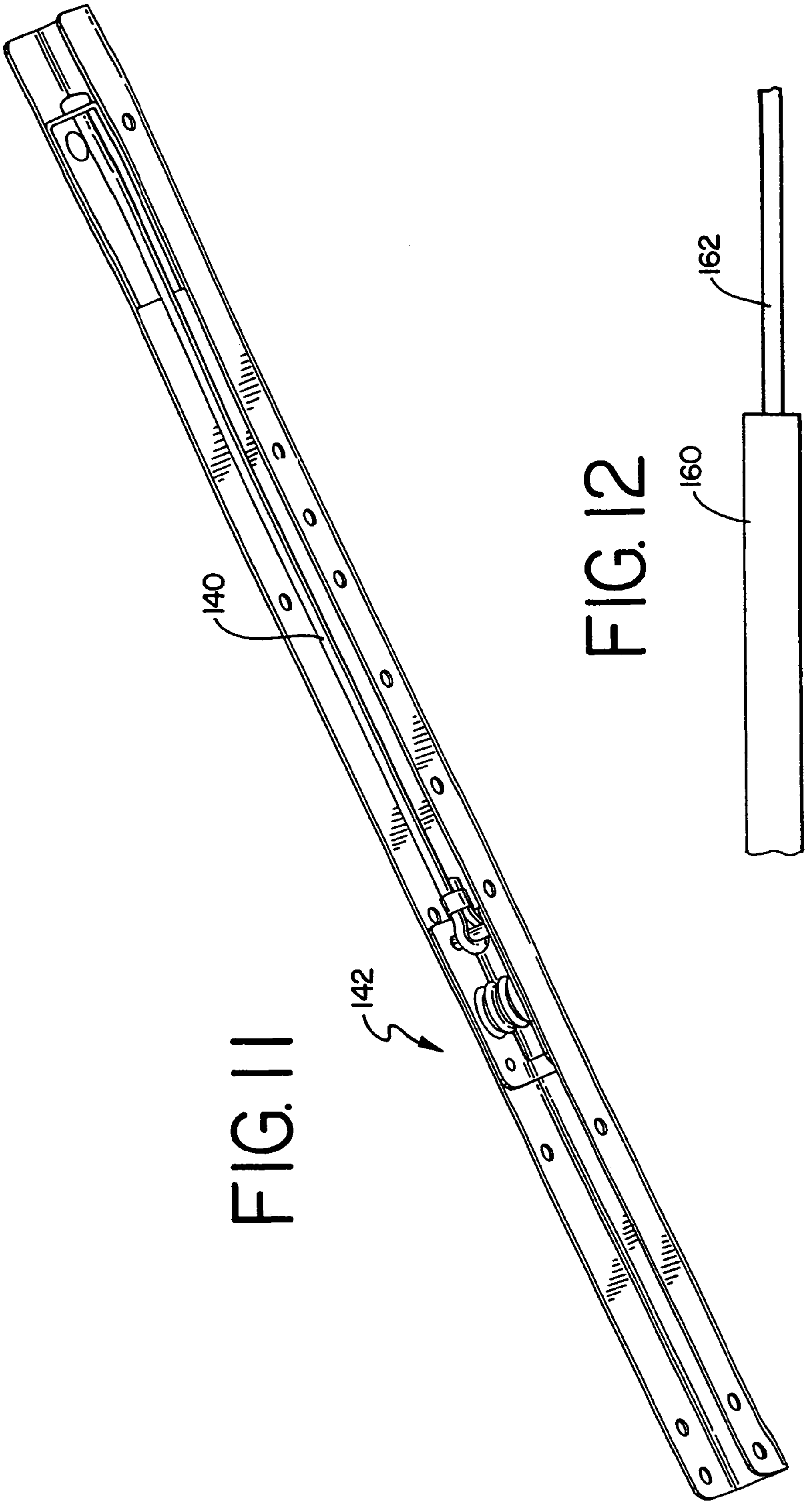
FIG. 11 is a perspective view of a block and tackle balance assembly incorporating an elastomer balance member.
FIG. 12 is a schematic view of a balance member comprising a plurality of balance members sequentially attached.

The cord assembly 142 connects the first elastomer member 122 to the second elastomer member 124. It is understood, however, that the first elastomer member 122 can be directly attached to the second elastomer member 124. It is further understood that an elastomer member can be comprised of a plurality of elastomer members sequentially attached. FIG. 12 schematically shows two elastomer members 160,162 sequentially attached at respective ends of the members 160,162. The cord assembly 142 generally includes a cord 144 and a first joiner 146 and a second joiner 148. The cord 144 has an intermediate portion 150 extending between a first end 152 and a second end 154. The first end 152 is connected to the first joiner 146 and the second end 154 is connected to the second joiner 148. The intermediate portion 150 passes over a support member 156. The support member 156 has a post 158 (FIG. 8) to support the intermediate portion 150. In an alternative embodiment, the support member 156 can have a pulley that the intermediate portion 150 passes around. The first joiner 146 is connected to the second end 128 of the first elastomer member 122. The second joiner 148 is connected to the first end 134 of the second elastomer member 124.

The first end 126 of the first elastomer member 122 is connected to the brake shoe 32. As shown in FIG. 1, the brake shoe 32 is connected to the sash window 12 by the sash pin 17. The second end 136 of the second elastomer member 124 is adapted to be connected to a lower portion of the master frame 14. In a preferred embodiment, a connector 160 is provided that is adapted to be connected to the master frame 14. The connector 160 is connected to the second end 136 of the second elastomer member 124.

The balance member 30 is positioned within the shoe channel 19. The support member 156 is attached at an upper portion of the master frame 14. The first elastomer member 122 extends upward from the brake shoe 32 wherein the cord 144 passes around the support member 156. The second elastomer member 124 extends downward wherein the connector 160 is connected to a lower portion of the master frame 14. The elastomer members 122,124 and cord 144 are sized to provide the adequate counterbalance force to the sash window 12. When the sash window 12 is raised or lowered, the cord 144 passes around the support member 156. When the sash window 12 is in its normally closed position, the second joiner 148 will abut the support member 156 to prevent too much tension from being applied to the second elastomer member 124.

The first elastomer member 122 and the second elastomer member 124 are made from members providing different tensile forces. This can be accomplished by varying different properties of the members 122,124. One particular way to vary the force is vary the diameter of the elastomer members. For example, the first elastomer member 122 generally has a larger diameter than the second elastomer member 124 to provide a greater counterbalancing force. This allows appropriate stretching of each member and takes into account the tensile set of the members so that the members will fit within the shoe channel 19 at the appropriate tension. In addition, by using two elastomer members, added stroke length is achieved. Upon movement of the window sash 12 to placed the balance member in a stretched state, the second elastomer member 124 is weaker than the first elastomer member 122 and, therefore, stretches first without the first elastomer member 122 stretching. Upon further movement of the sash window 12, the first elastomer member 122 and the second elastomer member 124 both stretch. The members 122,124 are sized such that overtensioning does not occur. The second joiner 148 abutting the support member 156 will help assure the second elastomer member 124 is not overtensioned.

The elastomer member 30 can be incorporated into other balance systems. For example, as shown in FIG. 11, an elastomer member 140 can replace the traditional spiral spring of a block and tackle balance system 142. The elastomer member 140 can be sized or made from different elastomer materials to fine tune the block and tackle balancer.

Figure 13:
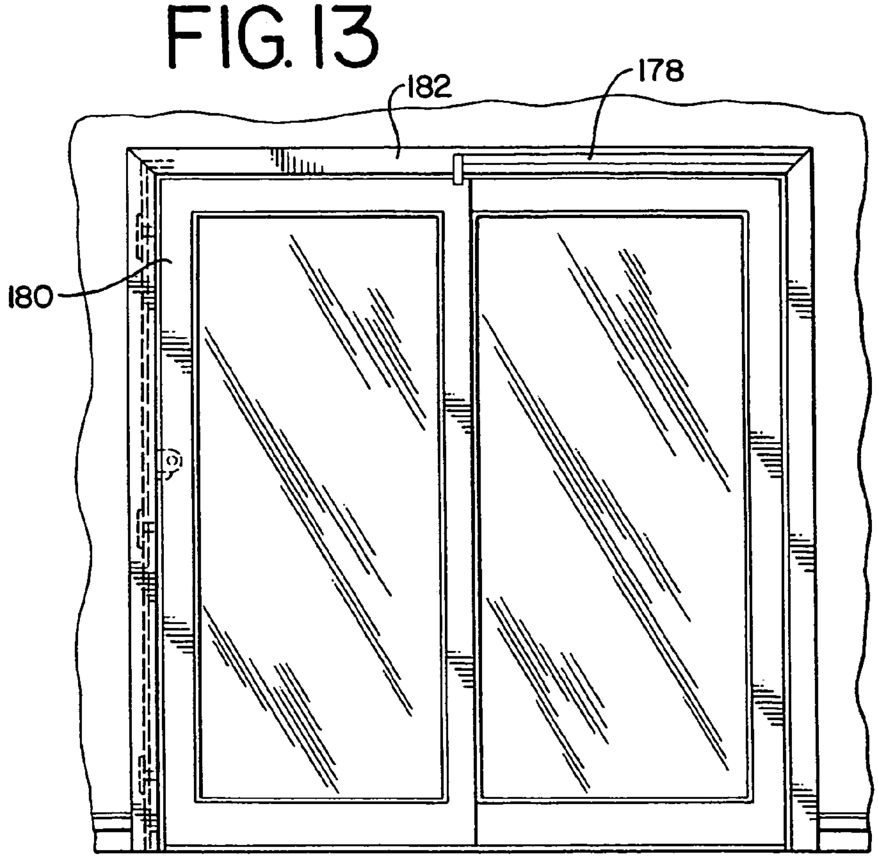
FIG. 13 is an elevational view of a sliding door having an elastomer balance member attached between the door and a door frame.
Figure 14:
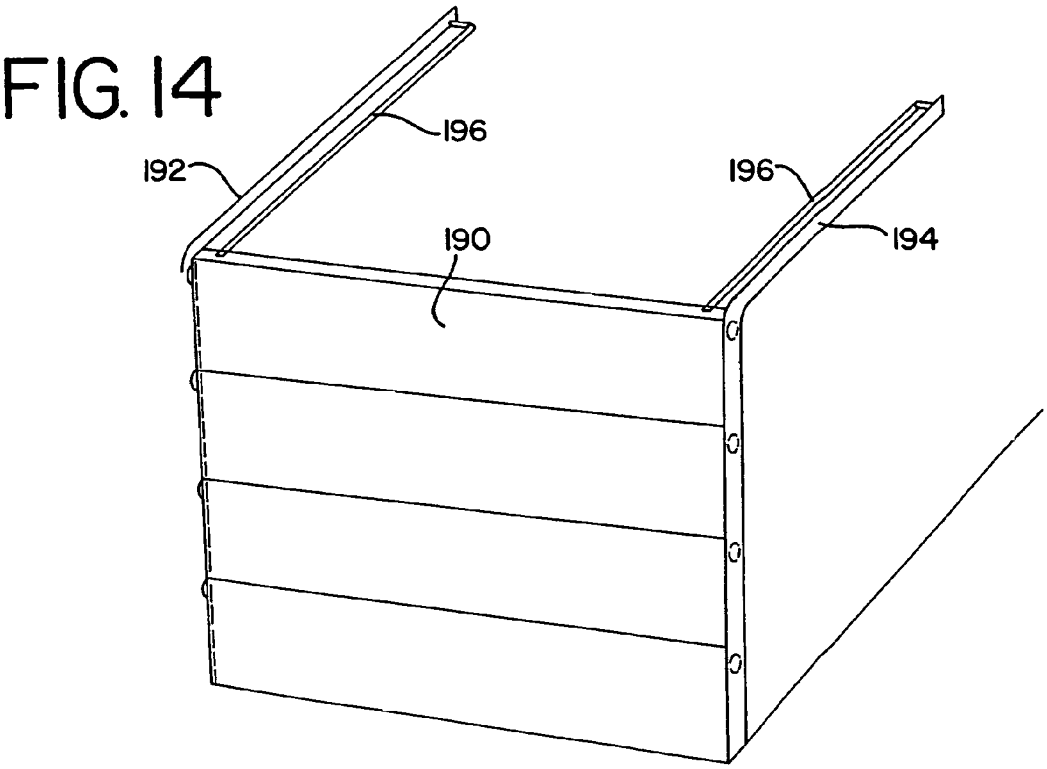
FIG. 14 is a schematic view of a garage door utilizing an elastomer balance member.

It is further understood that the balance member 30 can be utilized in many different applications in addition to a sash window assembly. The balance member 30 can be used with various sliding members that can benefit from a biasing force. The balance member 30 can be used in a structure having an opening wherein a closure is provided in the opening. The closure can be vertically operable or horizontally operable. For example, as shown in FIG. 13, an elastomer balance member 178 can be used in a sliding window application or a sliding door application. A patio door 180 is slideable within a door frame 182. The balance member 30 has one end suitably connected to the door 180 and another end suitably connected to the door frame 182. The balance member 178 can be connected at various positions such as the bottom of the door 180 although it is preferable to connect the balance member 178 at the top of the door 180. The balance member 178 provides a biasing force to assist in opening of the door 180. In another example, a garage has an opening that is closed by a garage door. FIG. 14 shows a schematic view of a garage door 190 movable in a pair of tracks 192,194. An elastomer balance member 196 can be attached between the garage structure (including tracks 192,194) and the garage door closure 190. Two balance members 196 could also be used. The balance member could also be used in automotive applications such as for trunk closures. The balance member can be utilized in a wide variety of other applications wherein a closure or other type of member positioned within a support structure requires a counterbalancing force. The balance member 30 can also be utilized in a sliding drawer requiring a biasing force such as for biasing the drawer closed. The balance member 30 could also be used in aerospace applications where weight and space are a consideration. The balance member is utilized in tension in both static and dynamic applications.

The elastomer balance member 30 of the present invention can be used as a tension spring and replace conventional metal tension springs. The elastomer member 30 can be used in applications wherein the member 30 must be significantly extended for an extended period of time while maintaining its ability to retract to its original length. Significant extension can be considered extension of at least a minimum of 10% of the ultimate elongation. Ultimate elongation is considered the maximum distance the member can be stretched before failure. In one particular application, significant extension can be considered, for example, 10% to 90% of the ultimate elongation. An extended period of time can be considered approximately several weeks time. In one particular application, an extended period of time can be, for example, three months. In determining whether the member has the ability to retract to its original length, a time period is set such as five minutes from being released from tension. Once the member retraction rate is negligible, the length of the member is determined. If the member has retracted to approximately within 10–20% of its original length, the member is considered to adequately maintain its elastomer properties. The elastomer balance member 30 has such properties. The member 30, such as silicone rubber in one preferred embodiment, can be significantly extended for an extended period of time while maintaining its ability to retract substantially to its original length thus maintaining its spring properties. It also resists attack from weather conditions including attacks from atmospheric ozone. It is noted that other rubbers such as latex rubbers do not have this ability to resist attack from atmospheric ozone.

The balance system of the present invention provides many advantages. Using an elastomer member provides a balance system requiring a less complex construction. The elastomer system is less expensive than traditional balance systems utilizing primarily metal components. The elastomer balance member can be sized to smaller diameters than, for example, spiral balances thus saving space. This allows for smaller channels in the master frame. The elastomer balance member can be fine-tuned to provide a most optimum counterbalancing force.

Figure 10:
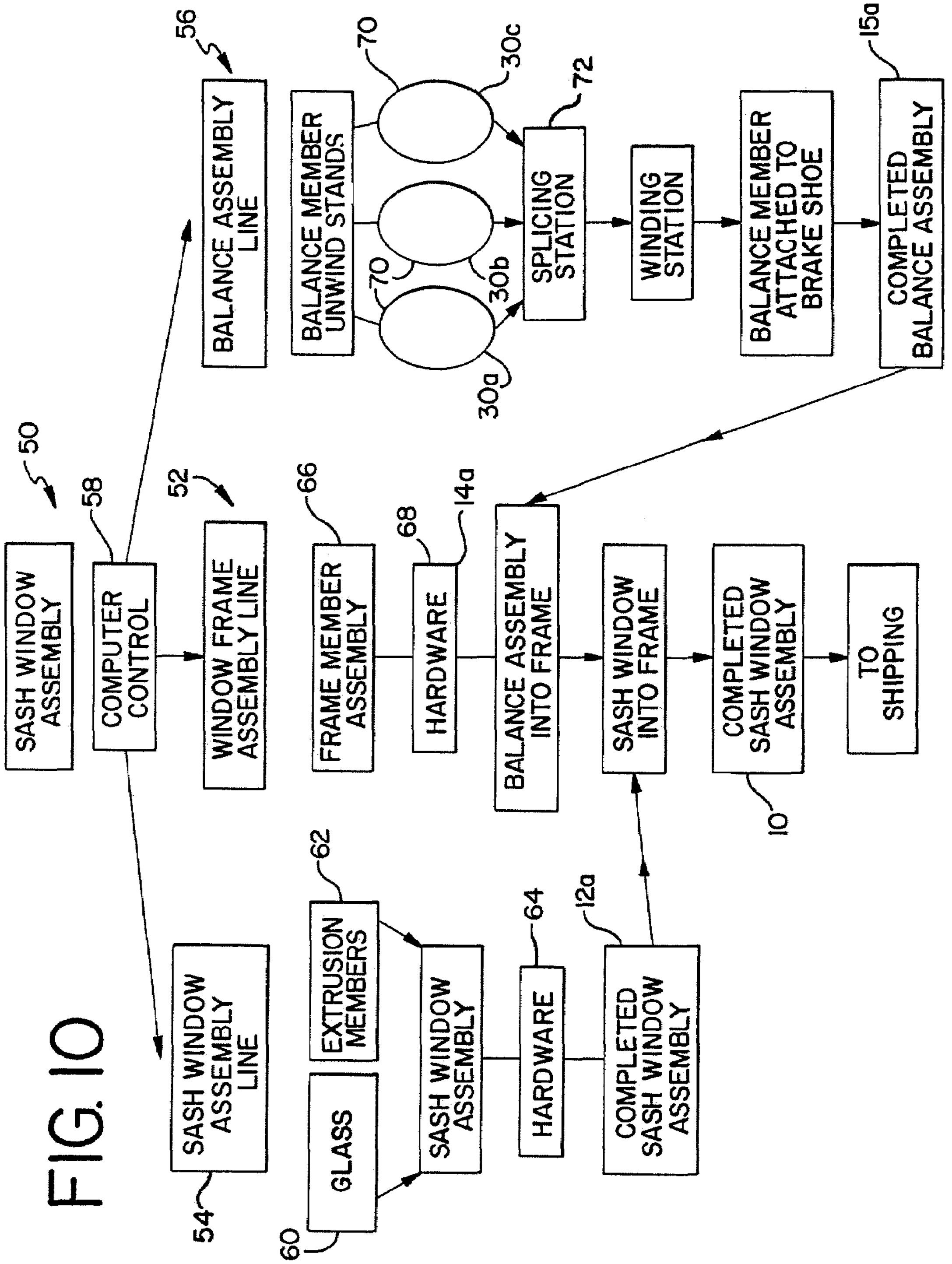
FIG. 10 is a schematic diagram of an automated system for manufacturing sash windows having balance systems of the present invention.

As discussed, the present invention provides a system 50 for custom-manufacturing of the balance assembly 15 and balance member 30 based on the specific type of sash window assembly 10 being manufactured. Ideally, all steps of the process are performed at the window manufacturer site. At the manufacturing site, window assemblies are sequentially made having various weights and dimensions. Thus, sequential window assemblies moving along an assembly line, if having different dimensions, weight etc., will require different balance assemblies. FIG. 10 shows a schematic view of the manufacturing system for the sash window assembly 10 in which all steps are performed at the window manufacturer's site. The system 50 generally includes a window frame assembly line 52, a sash window assembly line 54 and a balance assembly line 56. A computer control 58 is provided that is software controlled to control the manufacture of the sash window assembly. The computer control 58 is programmed at the beginning of the manufacturing process.

In the sash window assembly line, the individual components such as glass panes 60 and extrusion members 62 are connected to form the sash window 12*a*. Hardware components 64 are also connected to the sash window 12*a*. Simultaneously, the window frame assembly line 52 provides the required frame members 66 to be connected together to assemble the master frames 14. Any necessary hardware 68 is also connected to the window frame 14*a*.

Based on the specifications of the sash window 12*a* and the window frame 14*a*, the computer control 58 specifies to the balance assembly line 56 which materials are to be used for the balance member 30. The balance assembly line 56 includes a plurality of unwind stands 70, or spools, that each support a roll of different elastomer members. In one preferred embodiment, three different balance members 30 are provided. The balance members 30*a*,30*b*,30*c* are rated differently and thus provide different counterbalancing forces. The balance member 30 is unwound from the stand 70 with a minimum tension so as not to elongate the material. Depending on the desired counterbalance force and length, the balance members 30*a*,30*b*,30*c* pass over a cutting/splicing station 72 so that multiple members 30 can be cut and spliced together. It is understood that a window assembly 10 may only require a single balance member 30. In such case, a length of the elastomer material is unwound and is cut after determining the amount needed based upon the sash window 12*a* specifications. The cut and/or spliced balance members 30 may be wound onto a core and then a brake shoe 32 can be attached thus forming the balance assembly 15. Alternatively, the members 30 may not be wound onto a core. It is understood that based on the specifications of the sash window 12*a*, a single balance member 30 may be selected or multiple balance members 30 may be selected.

The assembly lines are structured wherein the balance assembly 15*a* is conveyed to the window frame assembly line 52 and connected to the window frame 14*a*. Likewise, the sash window 12*a* is conveyed to the window frame assembly line 52 and installed into the window frame 14*a* and connected to the balance assembly 15. The completed sash window assembly 10 is then ready to be shipped. As discussed, the computer control 58 controls how all of the individual components come together. The details of the balance assembly 15 can be calculated by the computer control 58 and preloaded into the system. Alternatively, the computer control 58 can be provided with tables that will specify the balance assembly components based on the specifications of the window assembly. The computer determines the amount of elastomeric material needed to form the balance member for each sash window assembly. Other information will also be input into the computer control 58 such as sash window travel length and sash window weight. This could also be calculated by using the frame and sash window dimensions and glass selection.

With the present system, sash window assemblies can be manufactured on site utilizing different rated balance systems based on end-customer demand. With the use of an elastomer as the balance member 30, cost-savings are utilized as it is less expensive than conventional metal balance springs. Also, the balance assemblies are custom-manufactured for each specific sash window assembly at the time the window assembly is being manufactured. All this is done right at the window manufacturer site. Thus, the need for large, multiple SKU balance assembly inventories is eliminated. Furthermore, because each balance assembly is manufactured for each specific window assembly, a more precisely balanced sash window is achieved.

While the specific embodiments have been illustrated and described, numerous modifications come to mind without significantly departing from the spirit of the invention and the scope of protection is only limited by the scope of the accompanying Claims.

We claim:

1. A system for manufacturing a plurality of sash window assemblies of varying dimensions, each of the sash window assemblies including a master frame, a sash slidable within the master frame, and a balance system coupled between the master frame and the sash, the system comprising:

means for providing a length of elastomeric material;

means for determining an amount of the elastomeric material needed to form the balance system of each of the sash window assemblies based upon each of the sashes' particular dimensions;

means for cutting each of the determined amounts of elastomeric material from the provided length; and means for installing each of the cut amounts of elastomeric material between the master frame and the sash of each of the respective sash window assemblies.

2. The system of claim 1 wherein the determining means comprises a computer.

3. The system of claim 1 wherein the providing means comprises a spool of the elastomeric material.

4. A system for manufacturing a plurality of sash window assemblies of varying dimensions, each of the sash window assemblies including a master frame, a sash slidable within the master frame, and a balance system coupled between the master frame and the sash, the system comprising:

a spool of elastomeric material;

a computer for determining an amount of the elastomeric material needed to form the balance system of each of the sash window assemblies based upon each of the sashes' particular dimensions including a weight of each particular sash;

means for cutting each of the determined amounts of elastomeric material from the spool of elastomeric material; and means for assembling the master frames.

5. A system for manufacturing a plurality of sash window assemblies of varying dimensions, each of the sash window assemblies including a master frame, a sash slidable within the master frame, and a balance system coupled between the master frame and the sash, the system comprising:

a spool of elastomeric material;

a computer for determining an amount of the elastomeric material needed to form the balance system of each of the sash window assemblies based upon each of the sashes' particular dimensions including a weight of each particular sash;

means for cutting each of the determined amounts of elastomeric material from the spool of elastomeric material;

means for assembling the master frames; and means for assembling one of the sashes within each of the assembled master frames.

* * * * *